(12) United States Patent
Hilton et al.

(10) Patent No.: US 10,780,601 B2
(45) Date of Patent: Sep. 22, 2020

(54) BLADE CLEANING FOR AUTOMATED FIBER PLACEMENT MACHINES

(71) Applicant: The Boeing Company, Chicago, IL (US)

(72) Inventors: Corydon Hilton, North Charleston, SC (US); Derek McCann, Ladson, SC (US)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 15/977,106

(22) Filed: May 11, 2018

(65) Prior Publication Data

US 2019/0344465 A1 Nov. 14, 2019

(51) Int. Cl.
*B26D 7/08* (2006.01)
*B29C 70/38* (2006.01)
*B29C 70/54* (2006.01)
*B26D 7/20* (2006.01)
*B29C 73/26* (2006.01)

(52) U.S. Cl.
CPC .......... *B26D 7/088* (2013.01); *B26D 7/204* (2013.01); *B29C 70/384* (2013.01); *B29C 70/545* (2013.01); *B26D 2007/208* (2013.01); *B29C 2073/264* (2013.01); *B29C 2793/0027* (2013.01)

(58) Field of Classification Search
CPC combination set(s) only.
See application file for complete search history.

(56) References Cited

U.S. PATENT DOCUMENTS

| 8,454,788 B2 | 6/2013 | Kisch |
| 9,126,365 B1* | 9/2015 | Mark ................... B29C 48/0022 |
| 2009/0071329 A1* | 3/2009 | Oldani ................... B03C 3/017 |
| | | 95/70 |
| 2017/0144386 A1* | 5/2017 | Engel ..................... B29C 70/382 |
| 2017/0197372 A1 | 7/2017 | Modin et al. |

OTHER PUBLICATIONS

GCC Patent Office Examination Report; Application GC 2019-37535; dated Apr. 24, 2020.

* cited by examiner

*Primary Examiner* — Erin F Bergner
(74) *Attorney, Agent, or Firm* — Duft & Bornsen, PC (57) ABSTRACT

Systems and methods are provided for cleaning composite fabrication machinery. One embodiment is a method for cleaning of a composite application machine, comprising: displacing an anvil of a head of an Automated Fiber Placement (AFP) machine from an operation location relative to a cutter, cleaning at least one of the cutter and the anvil, and relocating the anvil to the operation location relative to the cutter.

19 Claims, 9 Drawing Sheets

BLADE CLEANING FOR AUTOMATED FIBER PLACEMENT MACHINES

FIELD

The disclosure relates to the field of composite manufacturing, and in particular, to Automated Fiber Placement (AFP) machines. AFP machines are also referred to as Advanced Fiber Placement machines, and as Automated Tape Layup (ATL) machines.

BACKGROUND

AFP machines automatically layup constituent materials in order to form a laminate for curing into a composite part (e.g., a Carbon Fiber Reinforced Polymer (CFRP) part). For example, an AFP machine may lay up a laminate into a complex shape by precisely laying out constituent materials in a predefined pattern. In such a process the AFP machine dispenses constituent material from bundles of fiber (tows) that are impregnated with a resin and places the tows in pre-defined locations. Tows of fiber may then be consolidated to build up the laminate for further processing such as compression/consolidation, removal of volatiles, and curing.

During the layup process, cutters at the AFP machine may cut individual tows as they are dispensed by the AFP machine and laminated in order to position those tows on the composite part. The cutting process itself may involve clamping the tow, cutting the tow, and dispensing a cut portion of the tow onto the composite part. The completed laminate of constituent material may then be heated and/or compressed (e.g., in an autoclave separate from the AFP machine) to cure it into a composite part. An AFP machine may even cut and start tows of material while it continuously moves across the composite part that it is manufacturing.

The viscous and/or tacky nature of uncured resin within constituent material causes resin to accumulate upon the cutters within a head of the AFP machine during layup. This in turn necessitates disassembly of the head of the AFP machine, scrubbing of the cutters, and reassembly of the head of the AFP machine. The cleaning process is labor intensive, and increases an amount of down time experienced by the AFP machine. This in turn reduces the throughput of the AFP machine.

Therefore, it would be desirable to have a method and apparatus that take into account at least some of the issues discussed above, as well as other possible issues.

SUMMARY

Embodiments described herein provide automated cleaning systems for cutters of AFP machines. These automated cleaning systems enable removal of residue from cutters at the AFP machine, without the need to disassemble a head of the AFP machine. Because disassembly is no longer required, the overall speed of fabrication of the AFP machine is beneficially increased.

One embodiment is a method for cleaning of a composite application machine, comprising: displacing an anvil of a head of an Automated Fiber Placement (AFP) machine from an operation location relative to a cutter, cleaning at least one of the cutter and the anvil, and relocating the anvil to the operation location relative to the cutter.

A further embodiment is a non-transitory computer readable medium embodying programmed instructions which, when executed by a processor, are operable for performing a method for cleaning of a composite application machine, comprising: displacing an anvil of a head of an Automated Fiber Placement (AFP) machine from an operation location relative to a cutter, sliding a cleaning element into contact with a face of the cutter, scouring the face of the cutter with the cleaning element, retracting the cleaning element from the cutter, and relocating the anvil to the operation location relative to the cutter.

A further embodiment is an apparatus for cleaning a composite application cutter. The apparatus includes a head of a composite application machine, the head comprising: an anvil, a cutter that is located relative to an operation location of the anvil, a first apparatus that displaces the anvil from the cutter, and a second apparatus that facilitates cleaning of at least one of the cutter and the anvil while the anvil is displaced from the cutter Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
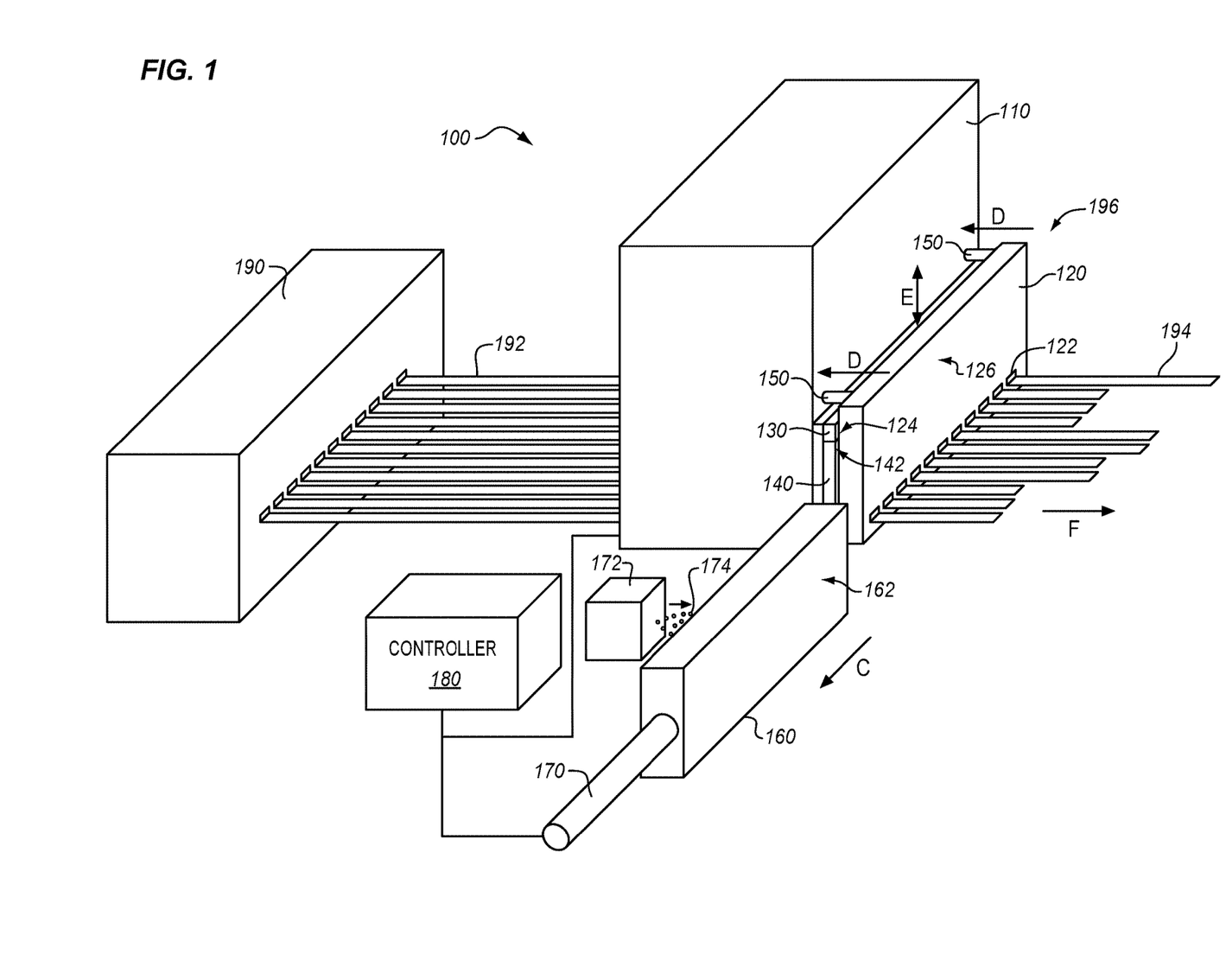
FIG. 1 is a diagram of an automated cleaning system for an AFP machine in an idle state in an illustrative embodiment.

FIG. 1 is a diagram of an automated cleaning system 100 for a composite fabrication machine (e.g., an AFP machine) in an idle state in an illustrative embodiment. Automated cleaning system 100 comprises any system component, or device that is operable to clean components of an AFP machine that cut tows 192 of uncured Carbon Fiber Reinforced Polymer (CFRP) into segments 194. Specifically, automated cleaning system 100 removes residue (e.g., uncured resin, carbon fiber filaments, etc.) from these components in order to preserve cut quality as layup continues and cuts are made.

In this embodiment, tows 192 are cut by cutters 140 sliding against anvil 120. Specifically, front faces 142 of cutters 140 slide against back face 124 of anvil 120 in a scissor-like action in order to perform cuts. Segments 194 that have been cut exit front face 126 via slots 122 in anvil 120, and proceed in direction F as they are laid-up. Cutter actuators 130 extend and retract along direction E in order to drive cutters 140 across back face 124 of anvil 120. Tows 192 are supplied to head 110 via tow feeder 190.

Automated cleaning system 100 includes first actuators 150, which displace anvil 120 from cutters 140. For example, as shown in FIG. 1, first actuators 150 have been retracted along direction D in order to place anvil 120 into contact with cutters 140. This position may be referred to as an "operation location" 196 for anvil 120. Automated cleaning system 100 also includes cleaning element 160, which includes surface 162 that may be driven across components of head 110 in order to perform cleaning. Cleaning element 160 may comprise a sponge, a scrubbing pad, or other suitable device for abrading front faces 142 and back face 124. Cleaning element 160 may desirably be stiff enough to remove residue from cutters 140 and anvil 120, while remaining soft enough not to degrade or damage cutters 140 and anvil 120. In FIG. 1, cleaning element 160 has been retracted by second actuator 170 in a direction C (e.g., a direction perpendicular to direction D). Surface 162 of cleaning element 160 receives a solvent 174 (e.g., acetone) from applicator 172, which may spray, drip, or otherwise apply the solvent 174. The solvent 174 enhances the ease of cleaning residue from components at head 110. In further embodiments, applicator 172 may directly apply solvent 174 to anvil 120 and/or cutters 140.

Controller 180 manages the operations of automated cleaning system 100 and may even direct the operations of the AFP machine as a whole (e.g., based on a Numerical Control (NC) program stored in memory). Controller 180 may be implemented, for example, as custom circuitry, as a hardware processor executing programmed instructions, or some combination thereof. The various actuators described herein (e.g., cutter actuators 130, first actuators 150, and second actuator 170) may be hydraulically powered, electrically powered, pneumatically powered, etc. as desired.

Figure 2:
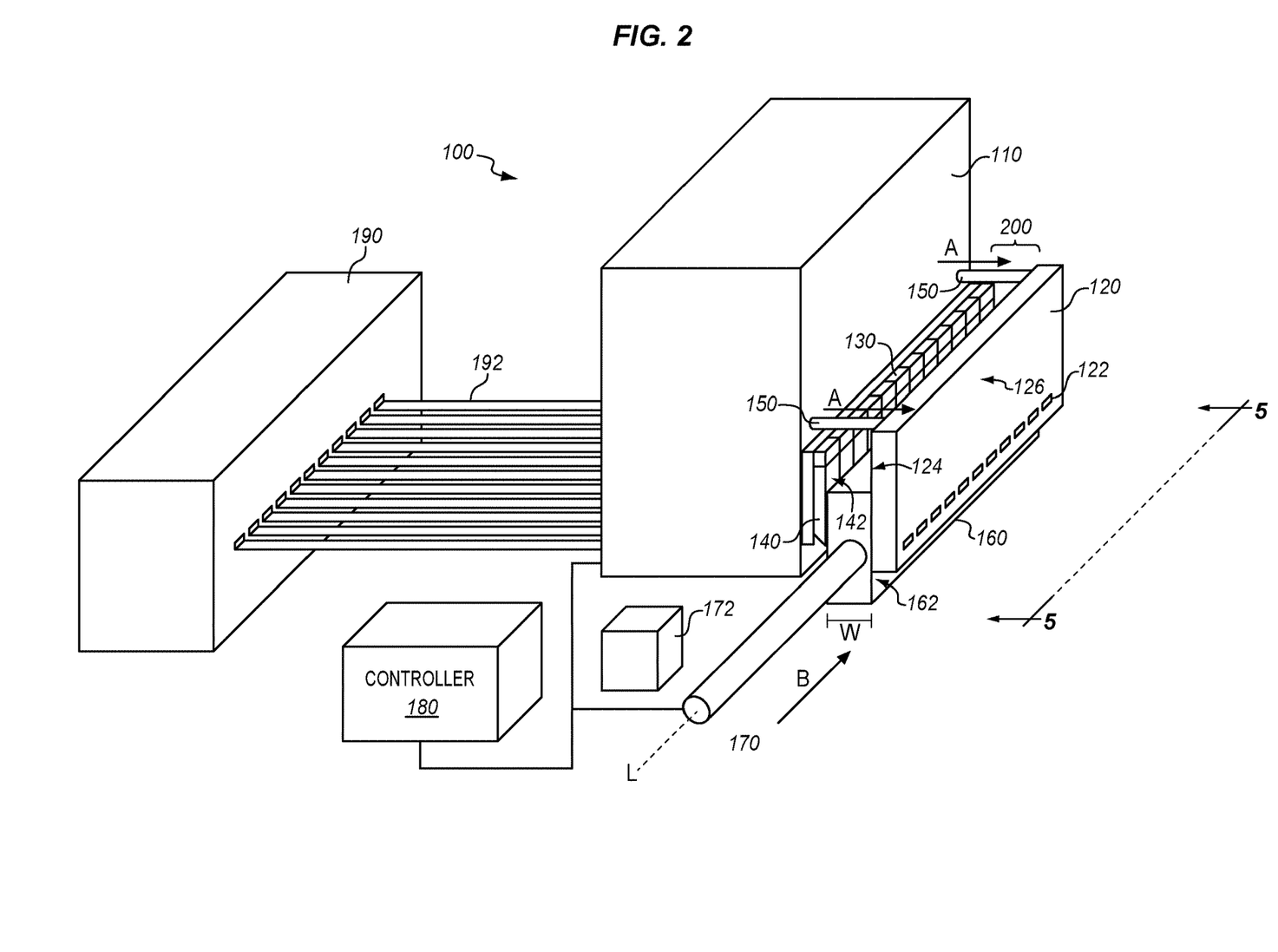
FIG. 2 is a diagram of an automated cleaning system for an AFP machine actively cleaning cutters of the AFP machine in an illustrative embodiment.

FIG. 2 is a diagram of an automated cleaning system 100 that is actively cleaning cutters 140 of an AFP machine in an illustrative embodiment. Head 110 has halted cutting and feeding of tows, and residue is being removed from components of head 110. In this embodiment, first actuators 150 have extended in direction A, which creates a gap 200 between front faces 142 of cutters 140, and back face 124 of anvil 120. Second actuator 170 extends in direction B, causing cleaning element 160 to be inserted into gap 200. Because cleaning element 160 has a width W that corresponds with a size of gap 200, surface 162 of cleaning element 160 contacts the front faces 142 and back face 124 during cleaning.

Illustrative details of the operation of automated cleaning system 100 will be discussed with regard to FIG. 3. Assume, for this embodiment, that an AFP machine (e.g., AFP machine 400 of FIG. 4) is in the process of laying up a laminate for curing into a composite part, but has paused in order to clean its cutters. Thus, no tows 192 are currently being cut or laid-up onto the laminate.

Figure 3:
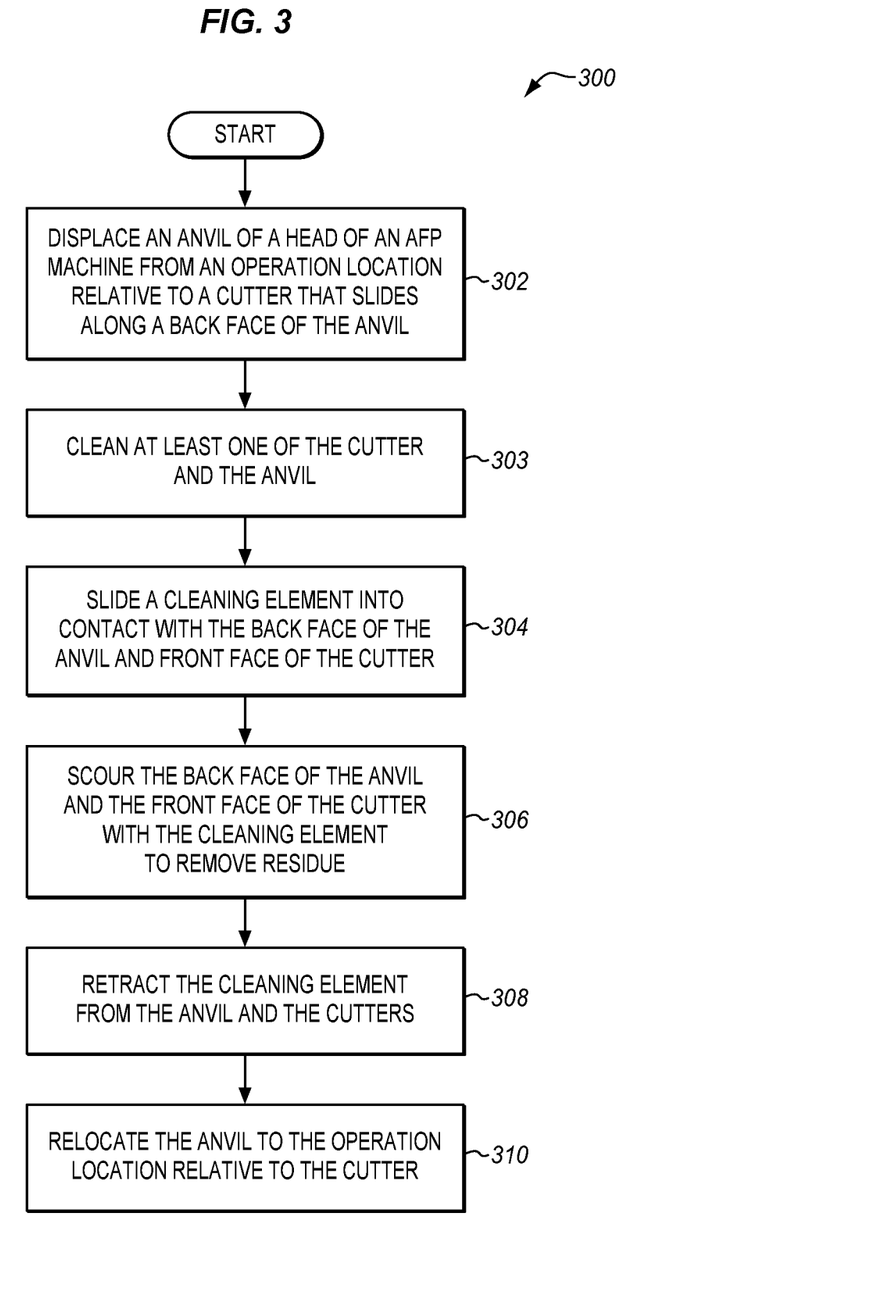
FIG. 3 is a flowchart illustrating a method for operating an automated cleaning system for an AFP machine in an illustrative embodiment.

FIG. 3 is a flowchart illustrating a method 300 for operating an automated cleaning system for an AFP machine in an illustrative embodiment. The steps of method 300 are described with reference to automated cleaning system 100 of FIG. 1, but those skilled in the art will appreciate that method 300 may be performed in other systems. The steps of the flowcharts described herein are not all inclusive and may include other steps not shown. The steps described herein may also be performed in an alternative order.

In step 302, controller 180 displaces anvil 120 from the operation location 196 relative to a cutter 140, which slide along back face 124 of anvil 120. For example, controller 180 may direct first actuators 150 to extend in direction A of FIG. 2. The motion of first actuators 150 creates gap 200 between cutters 140 and anvil 120. In further embodiments, first actuators 150 may be designed to displace anvil 120 vertically with respect to cutters 140, or even to rotate/pivot the anvil 120 in order to expose cutters 140.

With cutters and anvil 120 positioned for cleaning, controller 180 cleans at least one of the cutters 140 and the anvil 120 (step 303). For example, controller 180 may direct second actuator 170 to apply solvent 174 to cleaning element 160. In step 304, controller 180 directs second actuator 170 extend in direction B of FIG. 2. This slides cleaning element 160 into contact with back face 124 of anvil 120, as well as front faces 142 of cutters 140. Controller 180 further scours the back face 124 of anvil 120, and front faces 142 of cutters 140 with cleaning element 160 (step 306). In order to facilitate the cleaning process, controller 180 may cause second actuator 170 to extend and retract back and forth along direction B in a horizontal scrubbing motion and may even displace the second actuator 170 vertically in order to perform a circular or up-down scrubbing motion. In embodiments where cleaning element 160 is flexible or stretchable, second actuator 170 may even rotate about its lengthwise axis L in order to spin the cleaning element 160 during the cleaning process.

When scouring has completed and residue has been removed, controller 180 relocates anvil 120 to the operation location 196 relative to cutter 140 (step 308). For example, controller 180 may direct the second actuator 170 to retract cleaning element 160 in direction C of FIG. 1. Controller 180 further directs first actuators 150 to retract in direction D of FIG. 1 in order to place back face 124 of anvil 120 flush against front faces 142 of cutters 140. During this process, controller 180 may cause first actuators 150 to apply a desired amount of force holding the anvil 120 against cutters 140. This amount of force may ensure that cutters 140 slide across, but do not bind against, anvil 120 during operation. For example, controller 180 may cause first actuators 150 to cause anvil 120 to apply a threshold level of pressure (e.g., several kilopascals) against cutters 140.

Method 300 provides a substantial benefit over prior systems and techniques because it eliminates the need for disassembly and manual cleaning of elements of an AFP machine which perform cutting. This reduces the amount of down time and technician labor involved in operation of the AFP machine, which saves both time and money. Furthermore, a technician is provided with more time to spend inspecting ply sequences and layup by the AFP machine, which enhances overall quality of fabricated parts.

Figure 4:
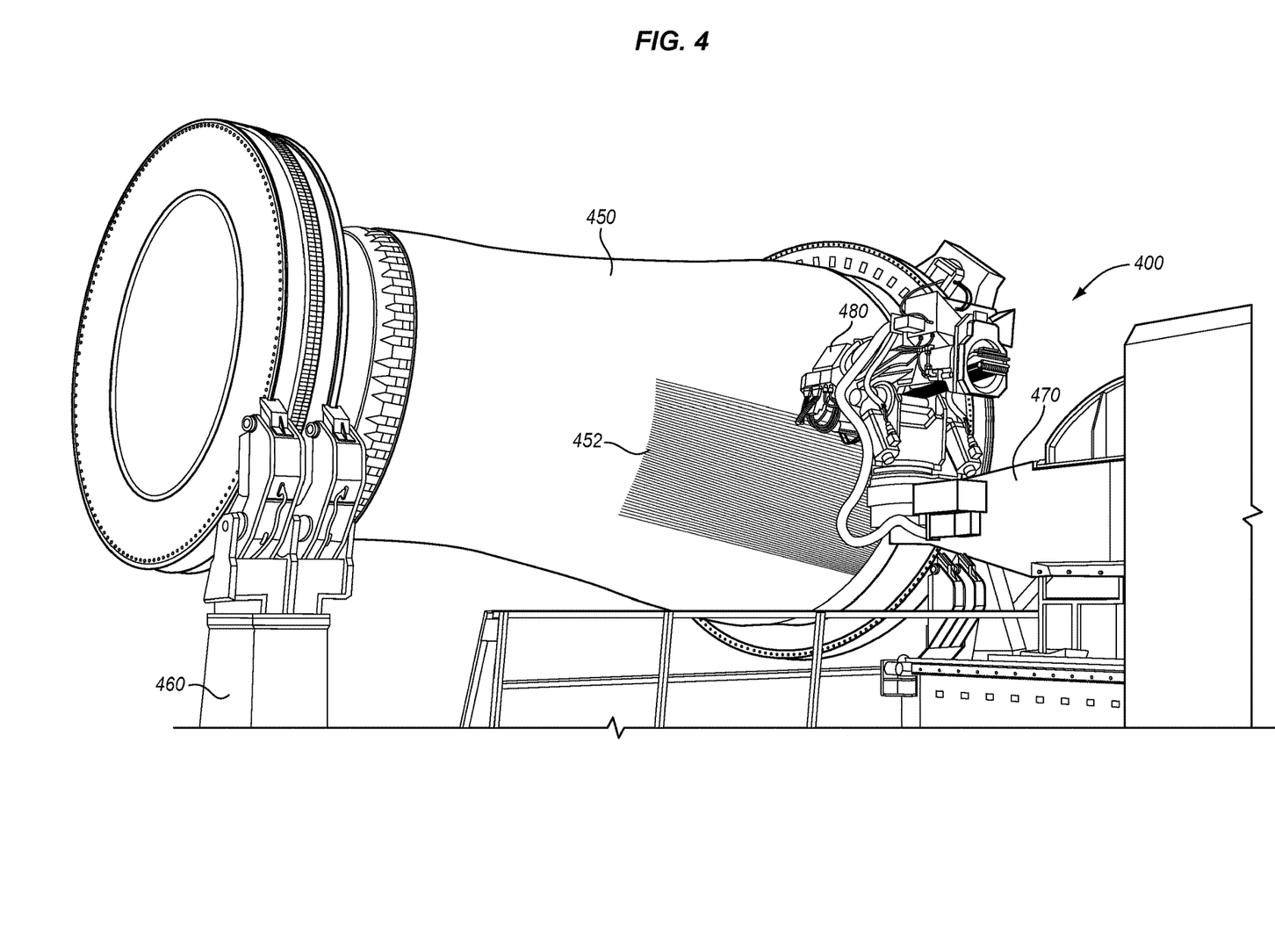
FIG. 4 is a diagram of an AFP machine that may include an automated cleaning system in an illustrative embodiment.

FIGS. 4-8 illustrate AFP machines and components which may include or otherwise be cleaned by the automated cleaning systems described above. Specifically, FIG. 4 is a diagram illustrating an AFP machine 400 that is mounted to a support 470 in an illustrative embodiment. AFP machine 400 comprises any system or device capable of laying up tows 452 of constituent material for curing into a composite part. AFP machine 400 includes head 480, which dispenses tows 452 of curable constituent material (e.g., uncured CFRP) during layup (e.g., concurrently). Tows 452 are laid-up to form laminate 450, which comprises one or more layers of material that will be cured into a single monolithic composite part. In this embodiment, laminate 450 comprises a fuselage section for an aircraft, and is held in place by rotational holder 460.

Figure 5:
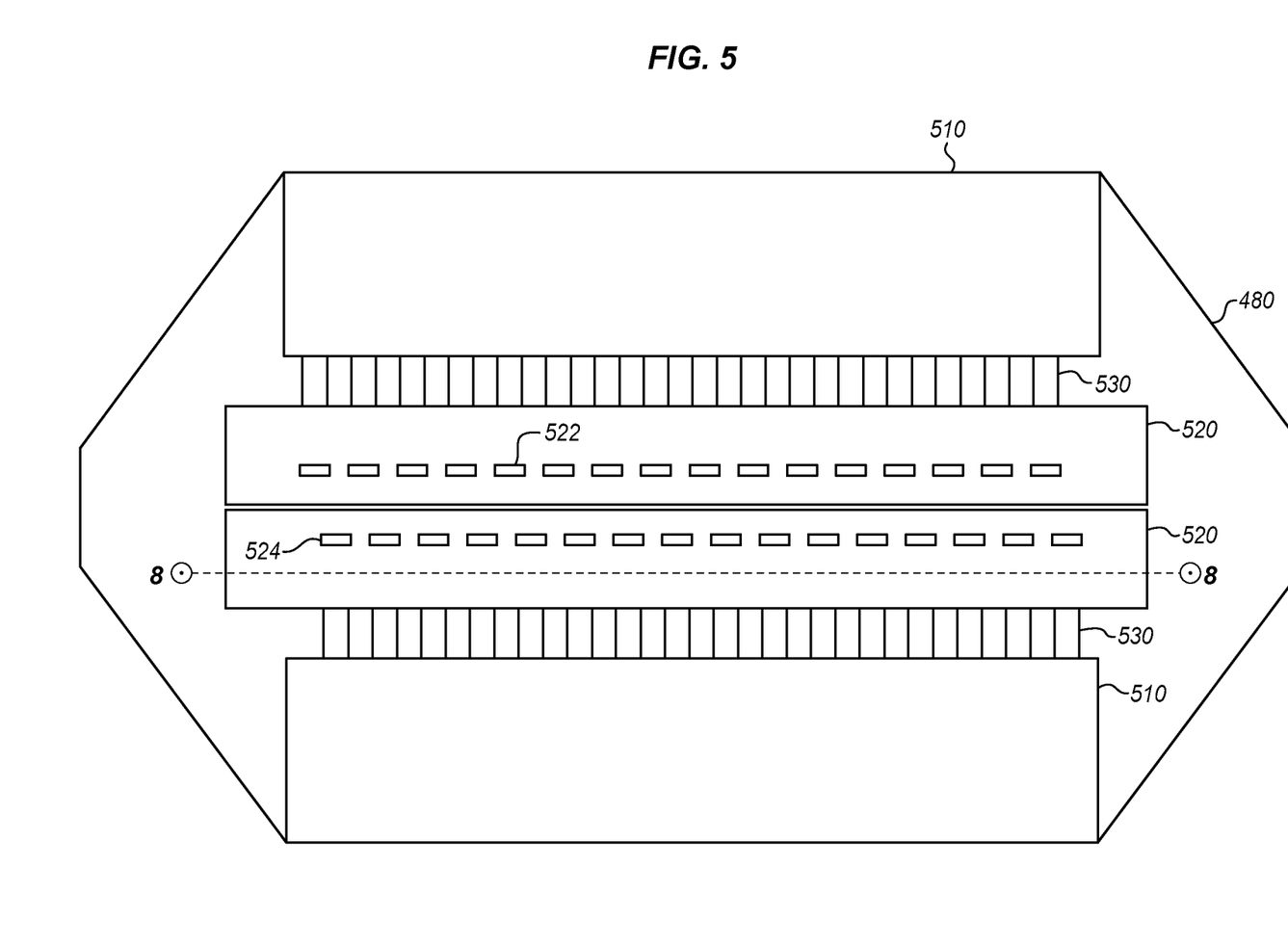
FIG. 5 is a front view of a head of an AFP machine that may be cleaned by an automated cleaning system in an illustrative embodiment.
Figure 6:
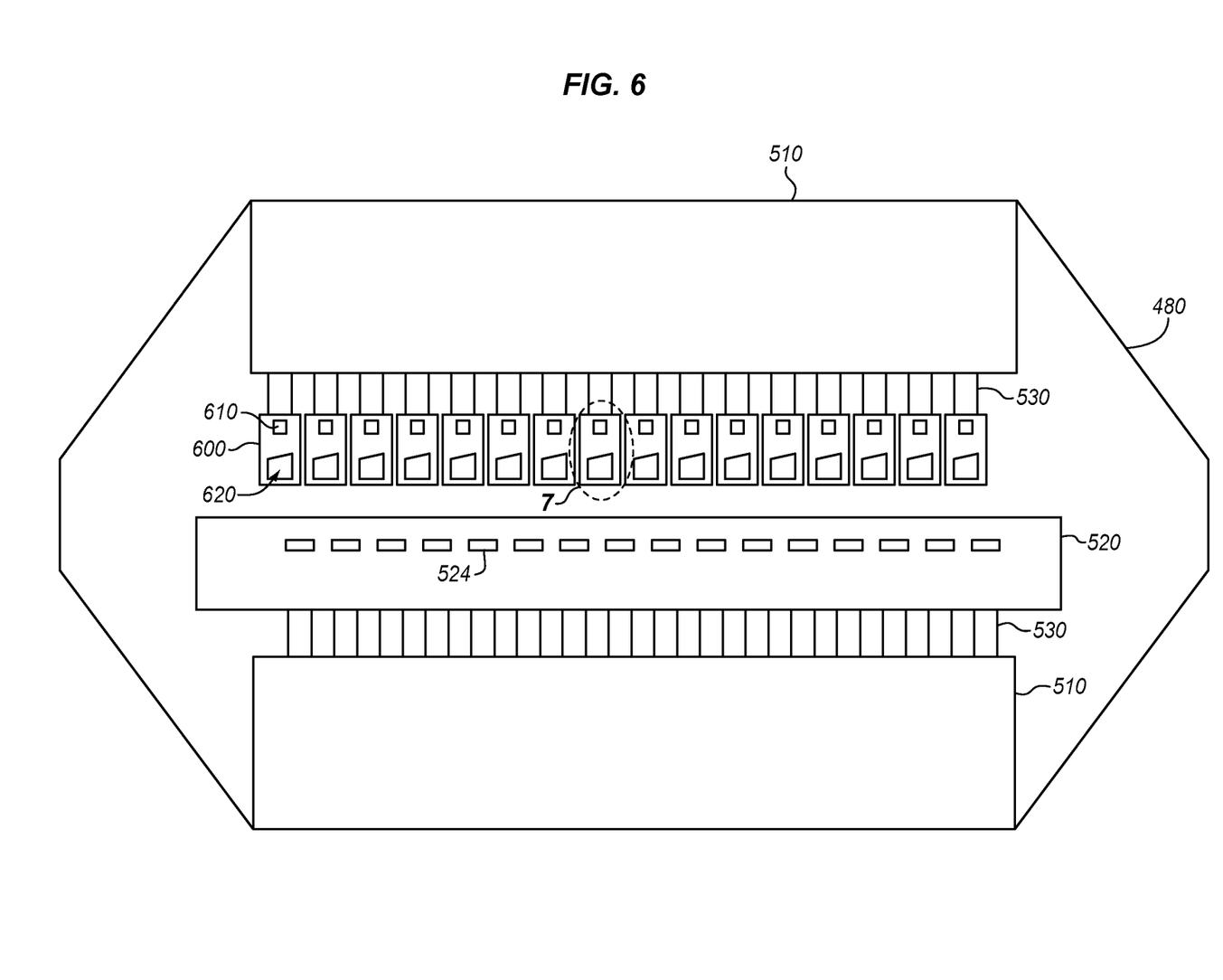
FIG. 6 is a front view of a partially disassembled head of an AFP machine that may be cleaned by an automated cleaning system in an illustrative embodiment.

FIG. 5 is a front view of head 480, and corresponds with view arrows 5 of FIG. 2. FIG. 5 illustrates that head 480 includes multiple anvils 520 (e.g., a top anvil and a bottom anvil), and that each anvil 520 has slots (e.g., slots 522 and slots 524) that are staggered with respect to slots in the other anvil. Each anvil 520 may be integrated into a corresponding cleaning system. Actuators 530 drive cutters which are hidden behind anvils 520, and manifolds 510 hold machinery that drives actuators 530. FIG. 6 corresponds with the view shown in FIG. 5, except that an anvil 520 has been removed in order to expose cutters 600. Thus, the position of the viewer and the angle of view remains the same in FIGS. 5-6, but an anvil has been removed in FIG. 6. In this embodiment, each cutter 600 includes a mounting hole 610, as well as a cutting hole 620.

Figure 7:
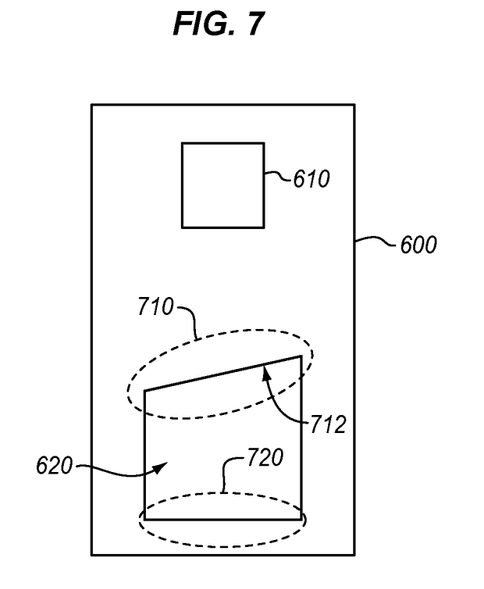
FIG. 7 is a front view of a region of a cutter that may be cleaned by an automated cleaning system in an illustrative embodiment.
Figure 8:
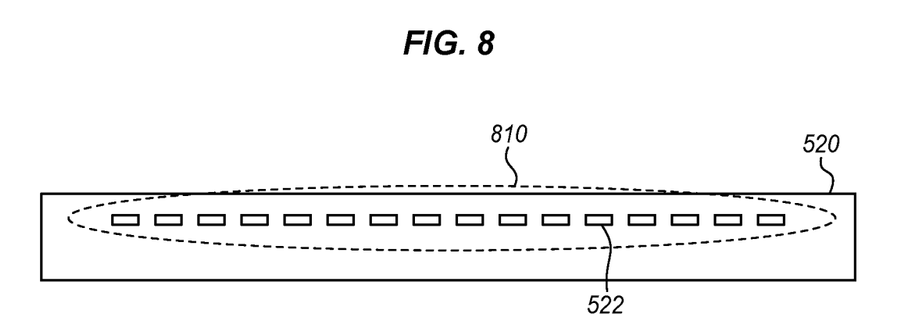
FIG. 8 is a back view of a region of an anvil that may be cleaned by an automated cleaning system in an illustrative embodiment.

FIG. 7 illustrates a cutter 600, and corresponds with region 7 of FIG. 6. As shown in FIG. 7, each cutter 600 is expected to accumulate residue in region 710, which covers blade 712. Region 710 comprises any material proximate to the blade 712 that structurally supports or forms the blade 712 (i.e., the cutting edge of cutter 600). Blade 712 is angled to facilitate cutting of tows. Region 720 helps to align and support blade 712 as cutter 600 slides against an anvil. FIG. 8 is a back view of an anvil. Hence, FIG. 8 corresponds with view arrows 8 of FIG. 5, which proceed out of the page. FIG. 8 illustrates that residue may accumulate proximate to slots 522.

EXAMPLES

In the following examples, additional processes, systems, and methods are described in the context of an automated cleaning system for an AFP machine.

Figure 9:
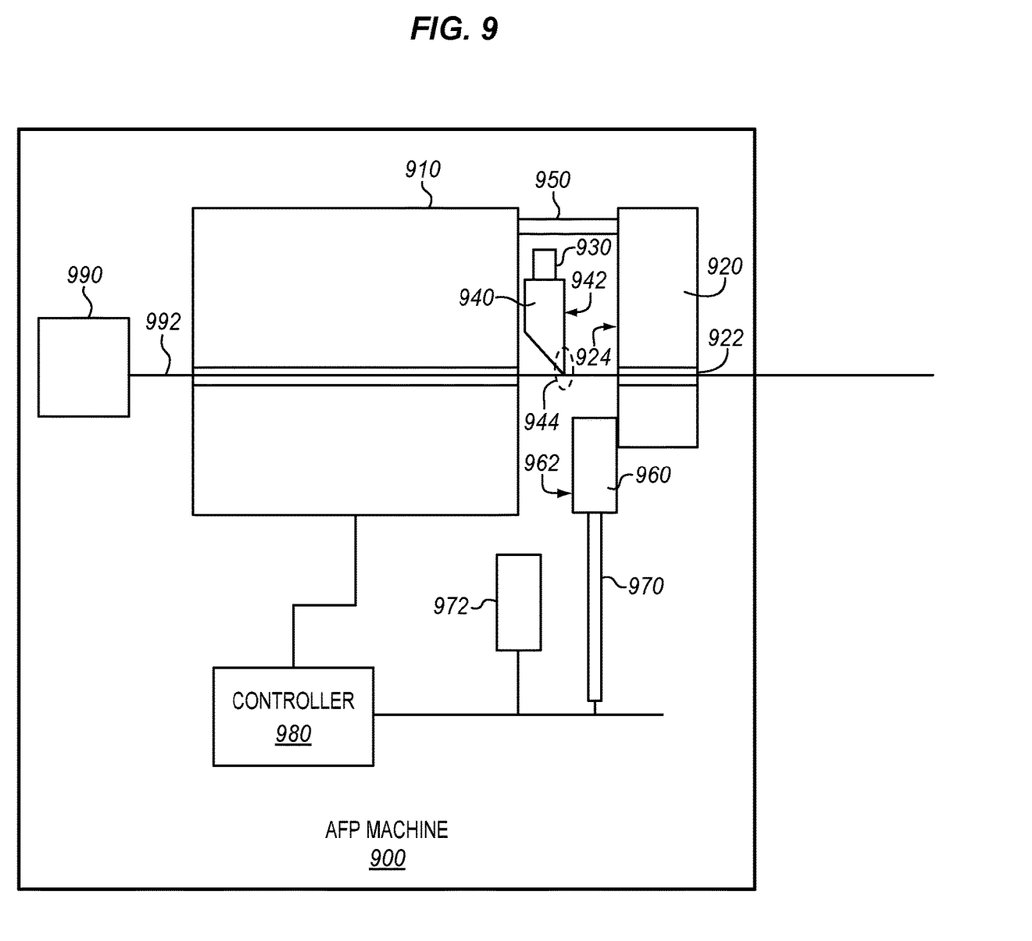
FIG. 9 is a block diagram of an AFP machine that includes an automated cleaning system in an illustrative embodiment.

FIG. 9 is a section cut block diagram of an AFP machine 900 that includes an automated cleaning system in an illustrative embodiment. According to FIG. 9, AFP machine 900 includes spool feeder 990, which supplies tows 992 to head 910. Tows 992 proceed to cutters 940, which are driven by actuators 930. Cutters 940 cut tows 992 by sliding front faces 942 across back face 924 of anvil 920. Cut tows proceed through slot 922 of anvil 920, and are dispensed as desired to form a laminate for curing into a composite part. Material accumulates in region 944 of cutters 940. First actuators 950 (each is also referred to as a "first apparatus") displace anvil 920 from cutters 940, which creates a gap through which cleaning element 960 may be inserted. Dispenser 972 applies solvent to cleaning element 960, and second actuator 970 (which is also referred to as a "second apparatus") drives surface 962 of cleaning element 960 into contact with both front faces 942 and back face 924. Controller 980 directs the actions of the various components described herein.

Figure 10:
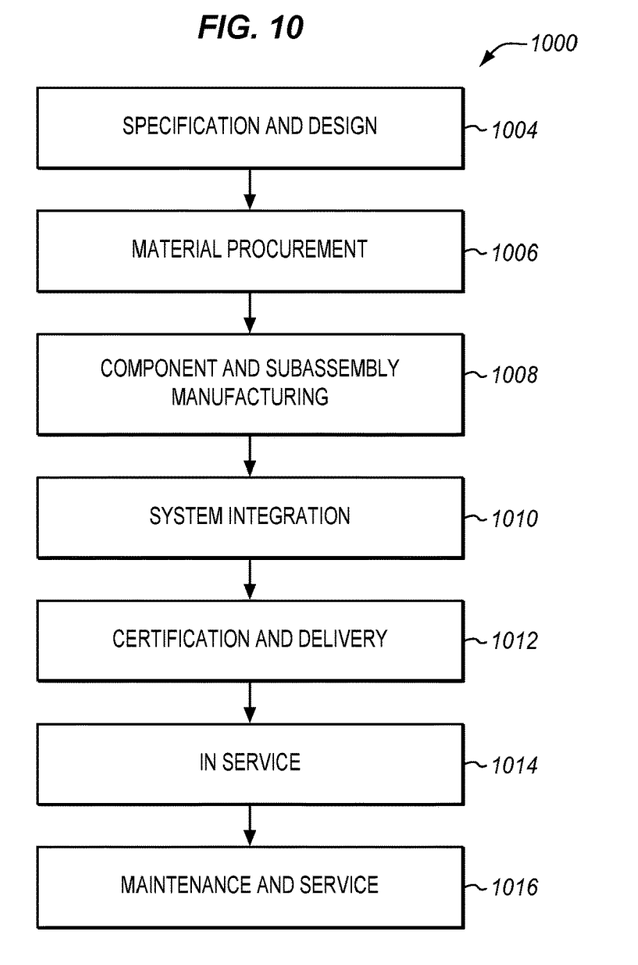
FIG. 10 is a flow diagram of aircraft production and service methodology in an illustrative embodiment.
Figure 11:
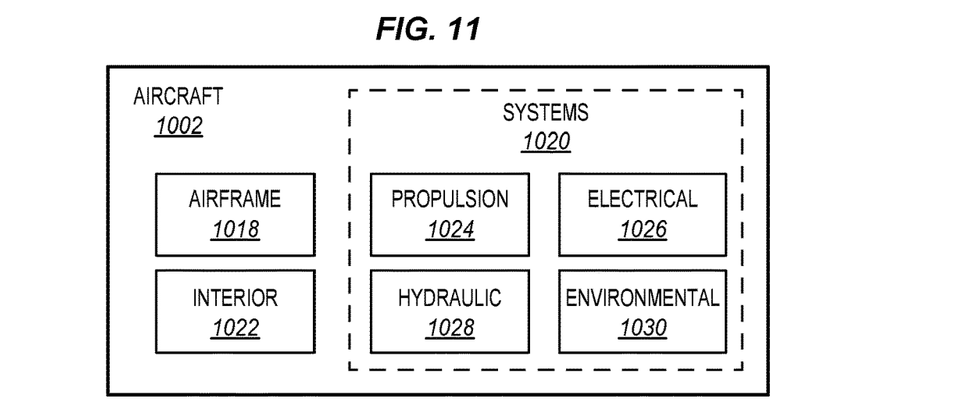
FIG. 11 is a block diagram of an aircraft in an illustrative embodiment.

Referring more particularly to the drawings, embodiments of the disclosure may be described in the context of aircraft manufacturing and service in method 1000 as shown in FIG. 10 and an aircraft 1002 as shown in FIG. 11. During pre-production, method 1000 may include specification and design 1004 of the aircraft 1002 and material procurement 1006. During production, component and subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine work in maintenance and service 1016 (which may also include modification, reconfiguration, refurbishment, and so on). Apparatus and methods embodied herein may be employed during any one or more suitable stages of the production and service described in method 1000 (e.g., specification and design 1004, material procurement 1006, component and subassembly manufacturing 1008, system integration 1010, certification and delivery 1012, service 1014, maintenance and service 1016) and/or any suitable component of aircraft 1002 (e.g., airframe 1018, systems 1020, interior 1022, propulsion system 1024, electrical system 1026, hydraulic system 1028, environmental 1030).

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 1002 produced by method 1000 may include an airframe 1018 with a plurality of systems 1020 and an interior 1022. Examples of systems 1020 include one or more of a propulsion system 1024, an electrical system 1026, a hydraulic system 1028, and an environmental system 1030. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1000. For example, components or subassemblies corresponding to component and subassembly manufacturing 1008 may be fabricated or manufactured in a manner similar to components or subassemblies produced while the aircraft 1002 is in service. Also, one or more apparatus embodiments, method embodiments, or a combination thereof may be utilized during the subassembly manufacturing 1008 and system integration 1010, for example, by substantially expediting assembly of or reducing the cost of an aircraft 1002. Similarly, one or more of apparatus embodiments, method embodiments, or a combination thereof may be utilized while the aircraft 1002 is in service, for example and without limitation during the maintenance and service 1016. For example, the techniques and systems described herein may be used for material procurement 1006, component and subassembly manufacturing 1008, system integration 1010, service 1014, and/or maintenance and service 1016, and/or may be used for airframe 1018 and/or interior 1022. These techniques and systems may even be utilized for systems 1020, including, for example, propulsion system 1024, electrical system 1026, hydraulic 1028, and/or environmental system 1030.

In one embodiment, a part is laid-up via an AFP machine that utilizes the components and methods described herein. The part comprises a portion of airframe 1018, and is manufactured during component and subassembly manufacturing 1008. The part may then be assembled into an aircraft in system integration 1010, and then be utilized in service 1014 until wear renders the part unusable. Then, in maintenance and service 1016, the part may be discarded and replaced with a newly manufactured part. Inventive components and methods may be utilized throughout component and subassembly manufacturing 1008 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for cleaning of a composite application machine, the method comprising:
   operating an anvil of an Automated Fiber Placement (AFP) machine in a cutting position, wherein a front face of a cutter of the AFP machine slides along a back face of the anvil on a cutting plane when in the anvil is in the cutting position;
   transitioning the anvil from the cutting position to a cleaning position by displacing the back face of the anvil away from the cutting plane;
   cleaning at least one of the cutter and the anvil while the anvil is in the cleaning position; and
   transitioning the anvil from the cleaning position to the cutting position.

2. The method of claim 1 wherein:
   transitioning the anvil from the cutting position to the cleaning position comprises extending a first actuator to move the anvil perpendicularly away from the cutting plane until a gap is formed between the back face of the anvil and the front face of the cutter; and
   transitioning the anvil from the cleaning position to the cutting position comprises retracting the first actuator to move the anvil perpendicularly towards the cutting plane until the back face of the anvil contacts the front face of the cutter.

3. The method of claim 2 wherein:
   cleaning at least one of the cutter and the anvil comprises:
      sliding a cleaning element into the gap and in contact with at least one of the front face of the cutter and the back face of the anvil;
      scouring at least one of the front face of the cutter and the back face of the anvil with the cleaning element; and
      sliding the cleaning element out of the gap.

4. The method of claim 3 wherein:
   sliding the cleaning element into the gap comprises extending a second actuator to move the cleaning element into the gap; and
   sliding the cleaning element out of the gap comprises retracting the second actuator to move the cleaning element out of the gap.

5. The method of claim 3 wherein:
   the scouring comprises driving the cleaning element across the back face of the anvil and the front face of the cutter.

6. The method of claim 3 wherein:
   the scouring comprises spinning the cleaning element.

7. The method of claim 1 wherein:
   transitioning the anvil from the cleaning position to the cutting position comprises driving the back face of the anvil against the front face of the cutter until a threshold level of pressure is applied to the front face of the cutter.

8. The method of claim 1 further comprising:
   the cleaning comprises applying a solvent to the cutter.

9. The method of claim 8 wherein:
   applying the solvent to the cutter comprises dispensing the solvent onto a cleaning element, and contacting the cutter with the cleaning element.

10. The method of claim 1 wherein:
    transitioning the anvil from the cutting position to the cleaning position comprises pivoting the back face of the anvil relative to the cutting plane.

11. The method of claim 1 further comprising:
    drawing a tow of uncured Carbon Fiber Reinforced Polymer (CFRP) through the anvil; and
    driving the cutter along the cutting plane to cut the tow of uncured CFRP.

12. An apparatus for cleaning a composite application cutter comprising:
    a head of an Automated Fiber Placement (AFP) machine, the head comprising:
       an anvil having a back face; and
       a cutter having a front face that slides along the back face of the anvil on a cutting plane when the anvil is in a cutting position;

a first apparatus that transitions the anvil from the cutting position to a cleaning position by displacing the back face of the anvil away from the cutting plane to form a gap between the front face of the cutter and the back face of the anvil; and
a second apparatus that cleans at least one of the cutter and the anvil while the anvil is in the cleaning position,
wherein the first apparatus transitions the anvil from the cleaning position to the cutting position.

13. The apparatus of claim 12 wherein:
the anvil includes slots for drawing tows of uncured Carbon Fiber Reinforced Polymer (CFRP) through the anvil from the back face of the anvil to a front face of the anvil;
the cutter is one of a plurality of cutters that include front faces in contact with the back face of the anvil, the plurality of cutters configured to be driven across the back face of the anvil to cut the tows;
the first apparatus is a first actuator; and
the second apparatus is a second actuator that slides a cleaning element into the gap and in contact with at least one of the front face of the cutter and the back face of the anvil.

14. The apparatus of claim 12 wherein:
the first apparatus pivots the back face of the anvil relative to the cutting plane to gain cleaning access to the cutter.

15. The apparatus of claim 12 further comprising:
an applicator that applies a solvent to the cutter.

16. The apparatus of claim 15 wherein:
the applicator directly applies the solvent to a cleaning element, and the cleaning element applies the solvent to the cutter.

17. The apparatus of claim 12 further comprising:
a controller that directs operations of the first apparatus and second apparatus to clean the anvil and the cutter.

18. The apparatus of claim 12 wherein:
the first apparatus and the second apparatus extend in directions that are perpendicular to each other.

19. The apparatus of claim 12 wherein:
the second apparatus causes the back face of the anvil to apply a threshold level of pressure against the front face of the cutter.

* * * * *